Patented Dec. 18, 1928.

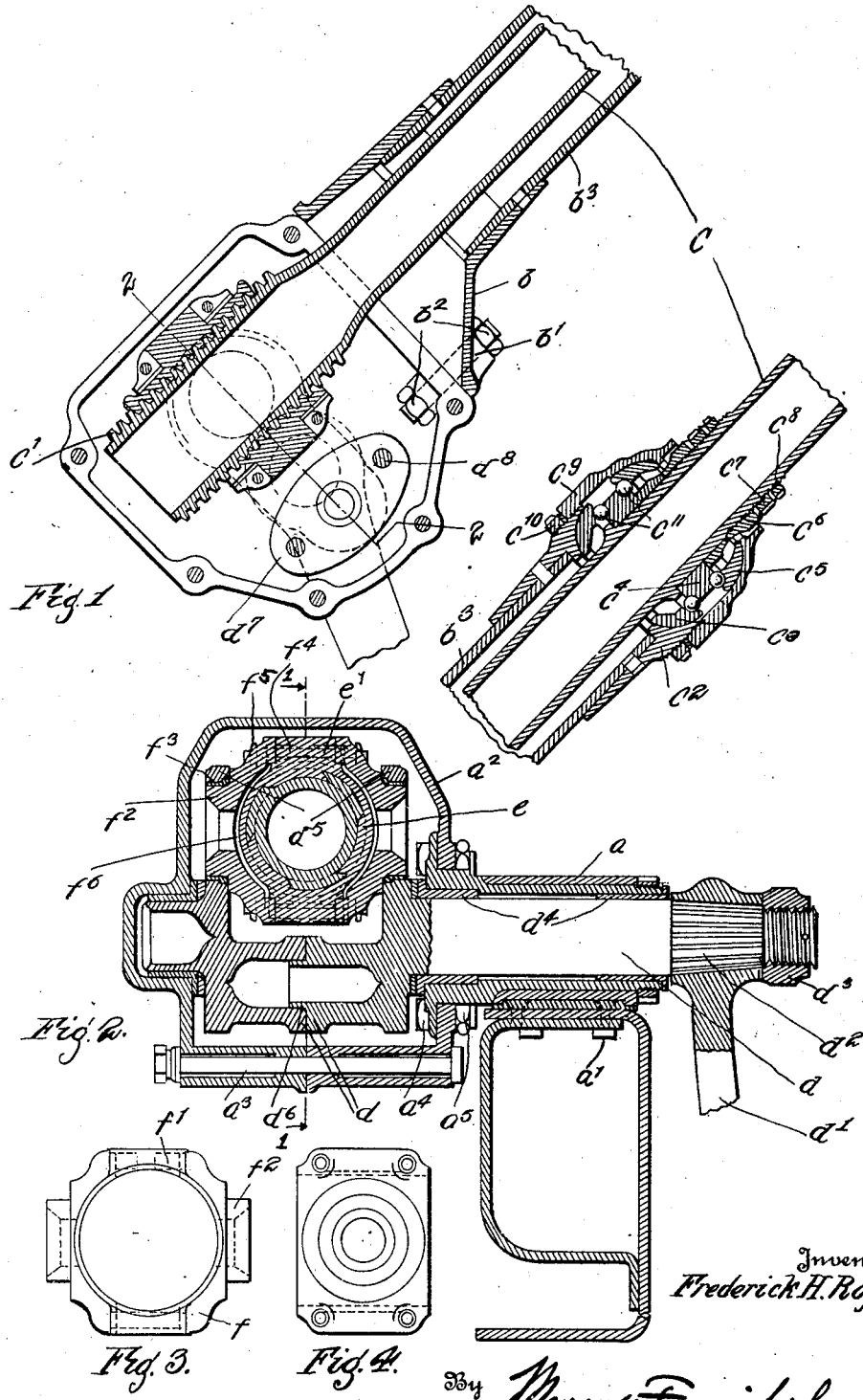

1,695,664

UNITED STATES PATENT OFFICE.

FREDERICK HENRY ROYCE, OF WEST WITTERING, NEAR CHICHESTER, ENGLAND, ASSIGNOR TO ROLLS-ROYCE LIMITED, OF DERBY, ENGLAND.

STEERING MECHANISM FOR MECHANICALLY-DRIVEN ROAD VEHICLES.

Application filed July 2, 1926, Serial No. 120,158, and in Great Britain July 10, 1925.

This invention has reference to the steering of mechanically driven road vehicles. The steering mechanism of such vehicles commonly comprises a rocking shaft from which a lever connected to the wheels is projected, and to which is attached a rocking arm which takes the form of two parallel levers at right angles to the axis of the rocking shaft supporting the gearing to the steering column.

In one form heretofore in use the gearing comprises a worm on the steering column engaging a corresponding thread of a nut, which is provided with trunnions extended on each side parallel to the axis of the rocking shaft, journalled in bearings in the said two levers, thus enabling the nut to rotate in a plane normal to the rocking shaft for the purpose of keeping alignment with the steering worm when travelling up or down the worm. This invention is an improvement on such form and consists in providing means whereby the said nut can within prescribed limits, vary its alignment in relation to the rocking shaft in a plane parallel to, as well as in a plane normal to the axis of such shaft, so as to enable the nut to keep perfect alignment with the steering worm notwithstanding slight inaccuracies of construction or distortions.

This I effect by introducing another element between the nut and the bracket or lever projected from the rocking shaft, and arranging that such other element shall be capable of rocking relatively to such shaft and to the nut, the planes of rotation being normal to one another.

For example I construct the nut with oppositely placed trunnions projected therefrom, and I construct a cage split in two halves to embrace the nut and forming journals for the trunnions thereof, the cage having oppositely placed trunnions extending therefrom, the axis of the trunnions on the nut and that of the trunnions on the cage being normal to one another, and the trunnions of the cage being journalled on the said levers attached to the rocking shaft. Preferably the axis of one set of trunnions is parallel with the rocking shaft. Except where the cage fits around the trunnions of the nut there is a small clearance between the nut and the cage so as to enable the nut to adjust itself as above explained.

In another form of this invention the exterior of the nut might be spherical, and be enclosed in a sleeve with a spherical interior connected to the rocking shaft, with means for preventing the nut from rotating.

In the accompanying drawings an example of my invention is illustrated.

Fig. 1 is a sectional view on line 1—1 of Fig. 2 and Fig. 2 is a sectional view on line 2—2 of Fig. 1. Figs. 3 and 4 are external views, (each at right angles to the other) of a cage made in two halves embracing the nut engaged by the steering column, the bolts and nuts holding the two halves together being omitted.

$a$ is a bracket secured by bolts $a^1$ to the side member of the chassis frame. $a^2$ is a case containing the mechanism made in two halves bolted together by bolts $a^3$, and secured to bracket $a$ by bolts $a^4$ and nuts $a^5$. $b$ is a bracket secured to casing $a^2$ by bolts $b^1$ and nuts $b^2$. $b^3$ is a steering column pegged and braised into the bracket $b$. $c$ is the steering shaft with the thread $c^1$, formed thereon engaging the nut $e$ hereinafter described, and supported at its other end, and axially located in the steering column, by ball bearings of which the components are the sleeve member $c^2$, secured to the column $b^3$ and having a spherical seat, the race $c^3$ seating on the member $c^2$, the race $c^4$ abutting on a shoulder formed on the shaft $c$, the race $c^5$, the internally threaded distance piece $c^6$ engaging a thread on the shaft $c$, the nut $c^7$ and lock nut $c^8$, the cap $c^9$ internally threaded at one end engaging a thread on the column $b^3$, the lock nut $c^{10}$ and balls $c^{11}$. $d$ is a shaft carrying the pendulum lever $d^1$, which is secured thereto by serrations $d^2$ and nut $d^3$ engaging a thread thereon, and rocking in bushes $d^4$. The shaft $d$ is crank shape (see Fig. 2) to afford clearance for the cage hereinafter described. Two flat annular brackets $d^5$ are formed on the shaft $d$, and to enable the brackets to be assembled around the cage hereinafter described the shaft is made in two parts spigoted together by spigot $d^6$; oval flanges $d^7$ are formed on the contiguous edges (see Fig. 1) and the two parts are secured together by bolts $d^8$ passing through perforations in such flanges. $e$ is a nut having its thread engaging the thread $c^1$ of the shaft $c$ formed with trunnions $e^1$. $f$ is a cage formed with cylindrical openings $f^1$ which form journals for the trunnions $e^1$, and with trunnions $f^2$ which are journalled in bushes $f^3$ located in the holes in the brackets $d^5$. The cage $f$ is made in two parts to enable it to be assembled around the nut $e$, the parts being secured together by bolts $f^4$ and nuts $f^5$.

There is a clearance $f^6$ between the nut $e$ and the cage $f$ to enable a small relative out-of-alignment movement to take place.

With apparatus described as above the nut $e$ the alignment of which should conform to that of the steering shaft $c$, can vary (to a limited extent) its alignment in relation to the rocking shaft $d$ both horizontally and vertically, and so keep perfect alignment with the steering shaft $c$ notwithstanding any small inaccuracy due to construction or distortion.

What I claim is:—

1. Steering mechanism for motor vehicles including a support, a steering shaft journaled in said support and provided with screw threads, a nut engaging said screw threads, a rock shaft journaled in said support and adapted to be operatively connected to the vehicle wheels, and means in which said nut is mounted to rotate about mutually perpendicular axes concurrent with the axis of said nut and operably connecting said rock shaft to said nut.

2. Steering mechanism for motor vehicles including a support, a steering shaft journaled in said support, and provided with a worm, a nut engaging said worm, a rock shaft journaled in said support and adapted to be operatively connected to the vehicle wheels, and means pivotally connecting said nut to said shaft to rock said shaft and pivoted about an axis parallel to said shaft and in which said nut is mounted to rotate about an axis perpendicular to the axis of said nut.

3. Steering mechanism for motor vehicles including a support, a steering shaft journaled in said support and having a worm formed thereon, a nut engaging said worm, a rock shaft journaled in said support and adapted to be operatively connected to the vehicle wheels, a lever extending radially from said shaft, and means rockable about mutually perpendicular axes perpendicular to the axis of said nut to connect said lever pivotally to said nut.

4. Steering mechanism for motor vehicles including a support, a steering shaft journaled in said support and having a worm formed thereon, a nut engaging said worm, and having diametrically opposite trunnions extending therefrom, a rock shaft journaled in said support and adapted to be operatively connected to the vehicle wheels, a bifurcated lever extending laterally from said rock shaft and having the furcations thereof extending on opposite sides of said nut, a cage embracing said nut and having bearings in which said trunnions are journaled, said cage being pivoted to said furcations to rock about an axis perpendicular to the axis of said trunnions.

5. Steering mechanism for motor vehicles including a support, a steering shaft journaled in said support and having a worm formed thereon, a nut engaging said worm, a rock shaft journaled in said support and adapted to be operatively connected to the vehicle wheels, and means operably connecting said nut to said rock shaft, and supporting said nut for rotation therein about mutually perpendicular axes, one of which is parallel to axis of said rock shaft, said rock shaft being laterally recessed to provide clearance for said connecting means.

6. Steering mechanism for motor vehicles including a support, a steering shaft journaled in said support and having a worm formed thereon, a nut engaging said worm, a rock shaft journaled in said support and adapted to be operatively connected to the vehicle wheels, said nut having diametrically opposite trunnions extending radially therefrom, a cage around said nut and having bearings in which said trunnions are mounted, said cage having diametrically opposite trunnions, the axis of which is perpendicular to the axis of the first named trunnions, and arms extending laterally from said rock shaft and provided with bearings to seat the cage trunnions parallel to the axis of said rock shaft, said rock shaft being recessed between said arms to provide clearance for said cage.

7. Steering mechanism for motor vehicles including a support, a steering shaft journaled in said support and having a worm formed thereon, a nut engaging said worm, a rock shaft journaled in said support and adapted to be operatively connected to the vehicle wheels, said nut having diametrically opposite trunnions extending radially therefrom, a cage around said nut and having bearings in which said trunnions are mounted, said cage having diametrically opposite trunnions, the axis of which is perpendicular to the axis of the first named trunnions, and arms extending laterally from said rock shaft and provided with bearings to seat the cage trunnions parallel to the axis of said rock shaft, the said rock shaft being formed in two alined sections joined between said arms, and means for securing said sections together.

8. Steering mechanism for motor vehicles including a support, a steering shaft journaled in said support and having a worm formed thereon, a nut engaging said worm, a rock shaft journaled in said support and adapted to be operatively connected to the vehicle wheels, said nut having diametrically opposite trunnions extending radially therefrom, a cage around said nut and having bearings in which said trunnions are mounted, said cage having diametrically opposite trunnions, the axis of which is perpendicular to the axis of the first named trunnions, and arms extending laterally from said rock shaft and provided with bearings to seat the cage trunnions parallel to the axis of said rock shaft, the said rock shaft comprising two alined sections pivoted about the same axis in said support and each having a part thereof offset parallel to said axis to provide a clearing recess for said cage, the end of one of said parts having a projection seated in a recess provided in the adjacent end of the other, and flanges bolted to each other formed on the contacting ends of said parts.

9. Steering mechanism for motor vehicles including a support, a steering shaft journaled in said support and having a worm formed thereon, a cylindrical nut operatively embracing said worm, a rock shaft journaled in said support and adapted to be operatively connected to the road wheels, a cage having a cylindrical bore of larger diameter than the external diameter of said nut and having a pair of diametrically opposite trunnions extending therefrom and being provided with diametrically opposite alined bearing apertures having the axis thereof perpendicular to the axes of said trunnions, a pair of diametrically opposite trunnions extending radially from said nut and seated in said apertures, a pair of parallel lever arms extending radially from said rock shaft and having alined bearing apertures formed therein and rotatably receiving the trunnions of said cage parallel to the axis of said shaft, said shaft being offset opposite said cage to provide clearance therefor during the rocking thereof.

10. Steering mechanism for motor vehicles comprising a casing having a steering column extending therefrom, a steering shaft extending through said column into said casing and having a worm formed on the part thereof in said casing, means for mounting the shaft to swing universally about the free end of said column, a rock shaft journaled in said casing and adapted to be connected to the road wheels of the vehicle, a nut engaging said worm, and means pivoted to said nut and to said rock shaft to rock said rock shaft by axial rotation of said steering shaft.

11. Steering mechanism for motor vehicles comprising a steering column, a steering shaft, means for mounting said shaft to pivot universally and rotate axially in said column, a rock shaft adapted to be operably connected to the vehicle wheels, a worm formed on the free end of said column, a nut engaging said worm, and means pivoted to said nut about an axis rotatable in a plane perpendicular to the axis of said rock shaft about an axis parallel thereto to rock said shaft by movement of said nut on said worm.

12. Steering mechanism for motor vehicles comprising a steering column, a steering shaft, means for mounting said shaft to swing universally and rotate axially in said column, a worm on said shaft, a nut engaging said worm, a cage pivoted to said nut and means pivotally connecting said cage to the road wheels of the vehicle.

13. Steering mechanism for motor vehicles comprising a steering column, a steering shaft, ball bearings suuporting said shaft rotatable about its axis in said column and to swing universally in said column casing connected to said column, a rock shaft journaled in said casing, and adapted to be operably connected to the road wheels of the vehicle, said rock shaft having a pair of bearing arms extending radially from said rock shaft and on opposite sides of said steering shaft, a cage pivoted to, and between said arms, a worm formed on the part of the steering shaft between said arms, and a nut pivoted in said cage and engaging said worm to rock said rock shaft by rotation of said steering shaft.

In witness whereof I have signed this specification.

FREDERICK HENRY ROYCE.